United States Patent [19]
Schildkraut

[11] Patent Number: 6,167,152
[45] Date of Patent: Dec. 26, 2000

[54] METHOD AND COMPUTER PROGRAM PRODUCT FOR REMOVING MICRODOTS FROM PHOTOGRAPHIC IMAGES

[75] Inventor: Jay S. Schildkraut, Rochester, N.Y.

[73] Assignee: Eastman Kodak Company, Rochester, N.Y.

[21] Appl. No.: 09/005,082

[22] Filed: Jan. 9, 1998

[51] Int. Cl.[7] ................................................... G06K 9/00
[52] U.S. Cl. ........................ 382/163; 382/100; 382/167; 382/274; 382/275; 358/534; 380/54
[58] Field of Search ...................... 382/100, 163, 382/167, 232, 274, 275; 380/51, 53, 54; 358/500, 533, 534, 536; 399/360, 355

[56] References Cited

U.S. PATENT DOCUMENTS

| | | | |
|---|---|---|---|
| 4,962,542 | 10/1990 | Klees | 382/54 |
| 5,131,058 | 7/1992 | Ting et al. | 382/21 |
| 5,267,030 | 11/1993 | Giorgianni et al. | 358/75 |
| 5,293,430 | 3/1994 | Shiau et al. | 382/42 |
| 5,778,106 | 6/1998 | Juenger et al. | 382/162 |
| 5,818,032 | 10/1998 | Sun et al. | 235/494 |
| 5,828,725 | 10/1998 | Levinson | 382/275 |
| 5,845,017 | 12/1998 | Keyes | 382/261 |
| 5,917,994 | 6/1999 | Perumal, Jr. et al. | 395/109 |

*Primary Examiner*—Matthew C. Bella
*Assistant Examiner*—Sheela Chawan
*Attorney, Agent, or Firm*—David M. Woods

[57] ABSTRACT

A method for removing microdots from a photographic image, the method comprises the steps of (a) comparing the blue code value at a location in the color image with an estimate of the blue code value at the location; (b) comparing a second code value at the location in the color image with an estimate of the second code value at the location; and (c) replacing the blue and second code values at the location with the estimated code values based on the results of steps (a) and (b).

8 Claims, 3 Drawing Sheets

METHOD AND COMPUTER PROGRAM PRODUCT FOR REMOVING MICRODOTS FROM PHOTOGRAPHIC IMAGES

FIELD OF THE INVENTION

The invention relates generally to the field of image processing, and more specifically, to efficiently removing yellow microdots from photographic images.

BACKGROUND OF THE INVENTION

Currently, in the photographic industry, microdots are placed on professional-grade photographic paper for identifying the image captured thereon as copyrighted. U.S. patent application Ser. No. 08/598,778 discloses such copyrighted images having microdots. The microdots are typically yellow in color before an image is printed on the document, and after an image is printed thereon, the color of each microdot is a combination of the original yellow color and the particular color of the image at the location of the microdot.

Under normal viewing conditions the microdots in the document are invisible to the unaided human eye. However, when a digital image of the document is made by a digital copying apparatus, the presence of the microdots can be detected by means of presently known image processing for indicating to the user that the image is copyrighted and should not be reproduced without the photographer's authorization. Upon this detection, the copying apparatus is precluded from making a copy.

In some situations, however, there is a legitimate reason to make a copy of the copyrighted document, and it becomes necessary to remove the microdots from the digital image of the documents. This is especially true if the image is enlarged so that the microdots become readily visible to the human eye.

The current solution to this problem is to use a "dust and scratch" removal algorithm that is commercially available.

Although the presently known and utilized method for removing microdots is satisfactory, it is not without drawbacks. While the above-described method will remove most or all of the microdots from the digital image, it will also slightly degrade a portion of or the whole image.

Consequently, a need exists for overcoming the above-described drawback.

SUMMARY OF THE INVENTION

The present invention is directed to overcoming one or more of the problems set forth above. Briefly summarized, according to one aspect of the present invention, the invention resides in a method for removing microdots from a color image, the method comprising the steps of: (a) comparing the blue code value at a location in the color image with an estimate of the blue code value at the location; (b) comparing a second code value at the location in the color image with an estimate of the second code value at the location; and (c) replacing the blue and second code values at the location with the estimated code values based on the results of steps (a) and (b).

It is the object of this invention to produce a method of microdot removal which removes substantially all of the microdots from the digital image without causing image degradation.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantage of microdot removal which removes substantially all of the microdots from the digital image without causing image degradation.

DETAILED DESCRIPTION OF THE INVENTION

In the following description, the present invention will be described in the preferred embodiment as a software program. Those skilled in the art will readily recognize that the equivalent of such software may also be constructed in hardware.

Still further, as used herein, computer-readable storage medium may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
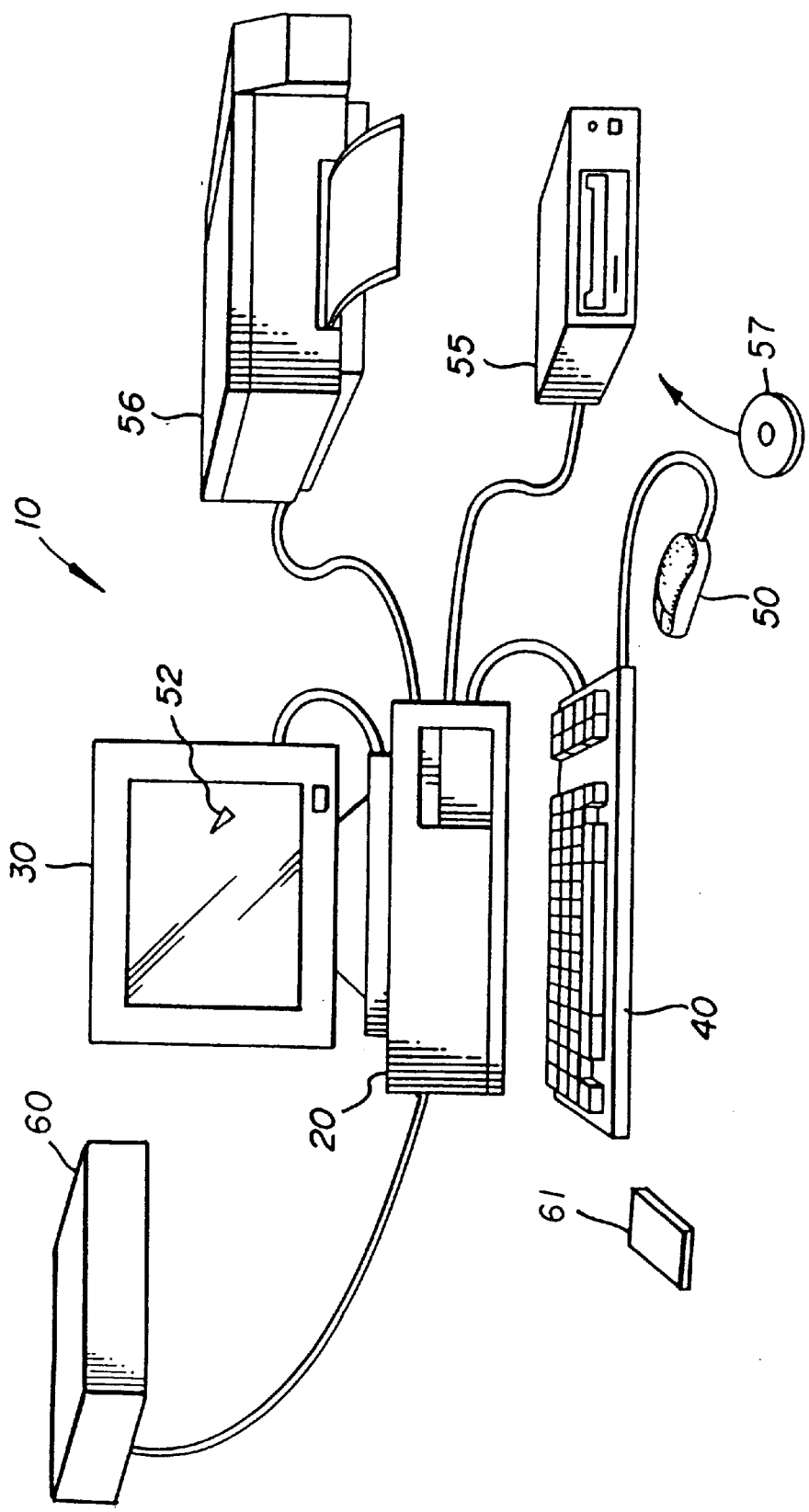
FIG. 1 is a perspective view of a computer system for implementing the present invention.

Referring to FIG. 1, there is illustrated a computer system 10 for implementing the present invention. Although the computer system 10 is shown for the purpose of illustrating a preferred embodiment, the present invention is not limited to the computer system 10 shown, but may be used on any electronic processing system. The computer system 10 includes a microprocessor-based unit 20 for receiving and processing software programs and for performing other processing functions. A display 30 is electrically connected to the microprocessor-based unit 20 for displaying user related information associated with the software. A keyboard 40 is also connected to the microprocessor-based unit 20 for permitting a user to input information to the software. As an alternative to using the keyboard 40 for input, a mouse 50 may be used for moving a selector 52 on the display 30 and for selecting an item on which the selector 52 overlays, as is well known in the art.

A compact disk-read only memory (CD-ROM) 55 is connected to the microprocessor-based unit 20 for receiving software programs and for providing a means of inputting the software programs and other information to the microprocessor based unit 20 via a compact disc 57, which typically includes a software program. In addition, a floppy disk 61 may also include a software program, and is inserted into the microprocessor based unit 20 for inputting the software program. Still further, the microprocessor-based unit 20 may be programmed, as is well know in the art, for storing the software program internally. A printer 56 is connected to the microprocessor based unit 20 for printing a hardcopy of the output of the computer system 10.

Images may also be displayed on the display 30 by placing an original image on a scanner 60 that is electrically connected to the microprocessor-based unit 20. The scanner digitizes the image into a digital representation having a plurality of pixels each typically having three chrominance code values, usually red, green, and blue code values. For an eight bit-based computer system, each chrominance band typically has a code value between 0–255.

Figure 2:
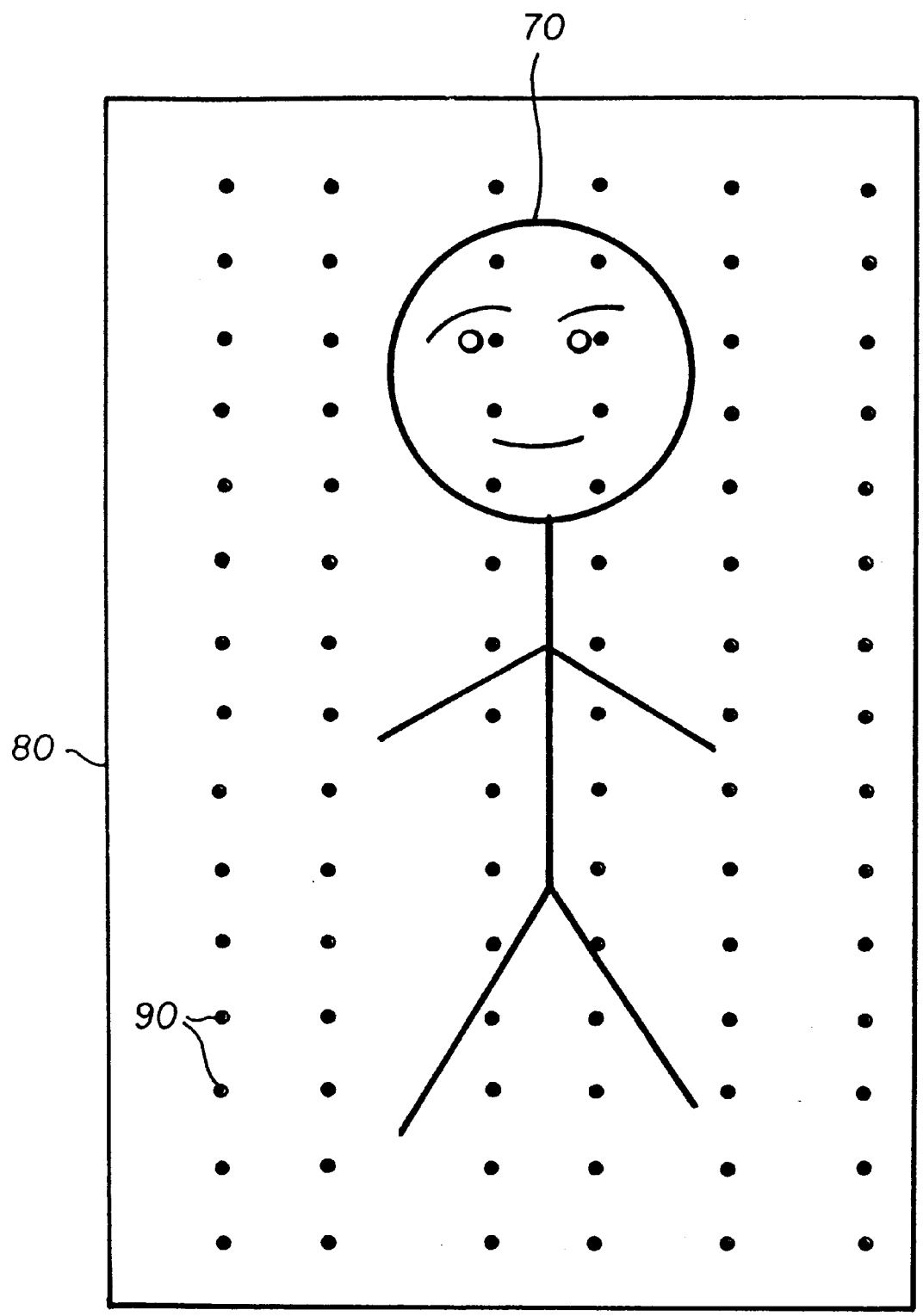
FIG. 2 is a front view of an image captured on photographic paper having microdots.

Referring to FIG. 2, there is illustrated an image 70 captured on photographic paper 80, usually professional-grade photographic paper, having a plurality of microdots 90 thereon typically arranged in a predetermined array. It facilitates understanding of the present invention to note that a yellow microdot will cause the blue code value at the location of the microdot to be lower than the blue code values surrounding the microdot.

Figure 3:
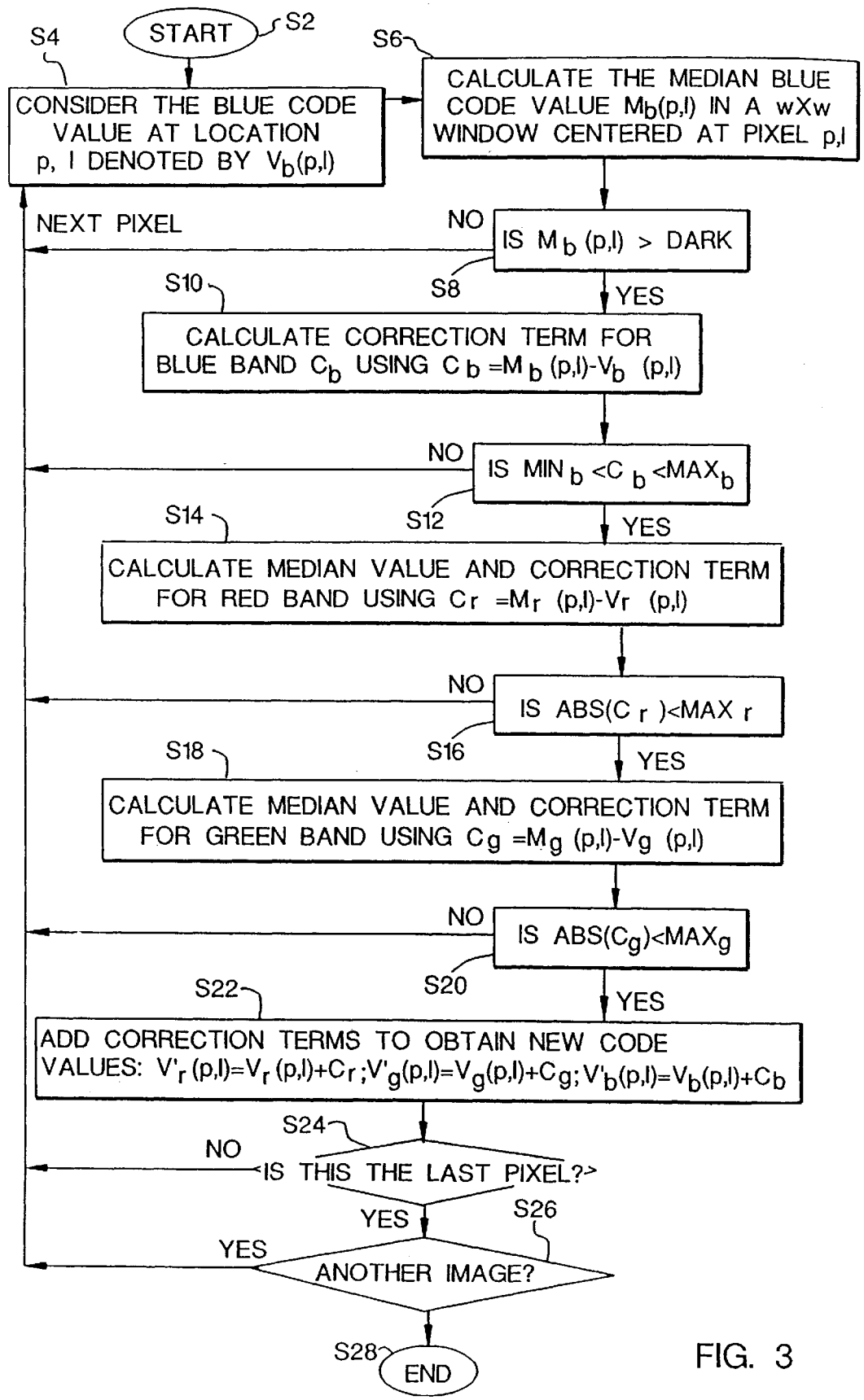
FIG. 3 is a flowchart of a software program of the present invention.

Referring to FIG. 3, a flowchart of a software program of the present invention implemented by the computer system 10 is illustrated. It is instructive to note that the flowchart illustrates a preferred embodiment of a software program contained on either the floppy disk 61, compact disc 57 or programmed into the microprocessor-based unit 20, although other computer-readable storage medium may also be used.

After the software program is initiated S2, the program sequentially processes each pixel in the image through the below described process. At the pixel of interest, the blue code value is considered first S4. The blue code value at location in the image at column p and row I is denoted by $V_b(p, l)$. First, the median blue code value $M_b(p, l)$ of pixels in a box of size w×w that is centered at this location is calculated S6 for permitting comparison of the median blue code value with the pixel of interest, as will be described hereinbelow in detail.

It should be understood that, if location p, l contains a microdot, $M_b(p, l)$ is an estimate of the blue code value of the image (scene) that was printed on the document at location p, l. The appropriate width w of the box is dependent on the size of the microdots in the copy-restricted document and the resolution at which it was scanned. For example, for the current copyrighted paper that is manufactured by the Eastman "KODAK" Company, if the scanner resolution is 200 dpi, then use w=5. Those skilled in the art will be able to determine other suitable sizes depending on their application.

If the value $M_b(p, l)$ is not greater S8 than the parameter Dark, preferably a code value of 50, then the scene printed on the paper at that location has a high enough yellow density to mask the yellow dot. In this case, the pixel at p, l is not altered and the next pixel is considered. The value Dark is dependent on the relationship between image code values and print density and is usually set by examination of the processed image.

If the value $M_b(p, l)$ is greater than Dark, the next step is to calculate a correction term S10 for the blue code value $C_b$ that will be used in overall corrections (Eqs. 4) if this location is determined by the below-described criteria to contain a microdot. The correction term is $C_b$ is calculated using the equation:

$$C_b = M_b(p, l) - V_b(p, l) \qquad \text{Eq. 1}$$

The affect of the yellow microdot is to lower the blue code value below that of the scene; therefore if a yellow microdot is located at position p, l, then $C_b$ should be a positive number. If $C_b$ is smaller than $Min_b$ S12, a small positive number typically 15, then there is either no yellow dot at this location or the blue code value of the scene is close enough to that of the dot that it is not necessary to modify the code value of the pixel.

One the other hand, if $C_b$ is greater than $Max_b$ S12, then the lowering of the blue code value relative to that of the scene is uncharacteristically large. Based on this, the program assumes that the pixel is not a yellow dot, and the program goes to the next pixel. The appropriate value of $Max_b$ is highly dependent on the copyrighted paper and the scanner used to produce the digital image. Typically a value of 100 is used.

The purpose of the next series of steps is to verify that the pixel is indeed a yellow dot. Next, the red code value of the pixel is considered. The median red code value $M_r(p, l)$ of pixels in a box of size w×w that is centered at pixel p, l is calculated S14. The correction term for the red code value $C_r$ uses the equation:

$$C_r = M_r(p, l) - V_r(p, l) \qquad \text{Eq. 2}$$

where $V_r$ is the red code value of the pixel of interest at location p, l. The affect of the yellow dot on the red code value of the pixel should be negligible. Therefore, if the absolute value of $C_r$ is larger than a positive number $Max_r$, typically 40, then the feature in the image that is responsible for a high value of $C_b$ is not yellow in color S16. It is concluded that a yellow dot does not exist at this location, the pixel's code values are not changed, and the next pixel is considered.

Similarly, the correction term for the green band $C_g$ is calculated S18 using the equation:

$$C_g = M_g(p, l) - V_g(p, l) \qquad \text{Eq. 3}$$

where $V_g$ is the green code value of the pixel of interest. The yellow microdots are normally not pure yellow in color and usually have some magenta density. For this reason, if a yellow dot is located at position p, l, $C_g$ may not be zero. Yet, if the absolute value of $C_g$ is larger than the positive number $Max_g$ S20 typically 100 then it is uncharacteristically large for a yellow dot. The program concludes that the pixel is not a yellow dot, the pixel's code values remain unchanged, and the next pixel is considered.

If all of the above conditions are satisfied the pixel's red, blue, and green code values are modified S22 according to the equations:

$$V'_r(p, l) = V_r(p, l) + C_r \; V'_g(p, l) = V_g(p, l) + C_g V'_b(p, l) = V_b(p, l) + C_b \qquad \text{Eq. 4}$$

If a yellow dot is located at position p, l tests show that this is very effective in removing the appearance of a yellow dot from the image at that location.

The program checks S24 whether this is the last pixel. If it is not, the program continues to the next pixel. If it is, the user may either exit S28 the program or start the above-described process on another image S26.

Using this procedure, only a small fraction of the pixels in the image are modified, most of which correspond to yellow dots in the image. For this reason the removal of the yellow dots from the image by this method has a negligible affect on the quality of the scene.

The invention has been described with reference to a preferred embodiment. However, it will be appreciated that variations and modifications can be effected by a person of ordinary skill in the art without departing from the scope of the invention.

Parts List:
10 computer system
20 microprocessor-based unit
30 display
40 keyboard
50 mouse
52 selector
55 CD-ROM
56 printer
57 compact disc
60 scanner 61 floppy disk
70 image
80 photographic paper
90 microdots

I claim:

1. A method for removing yellow microdots from a color image, the method comprising the steps of:
    (a) providing a color image having a plurality of microdots arranged in a predetermined array within image data;
    (b) comparing a blue code value at a location in the color image with an estimate of the blue code value for the location obtained from one or more surrounding locations, in order to determine whether the location may contain a microdot that requires correction;
    (c) comparing a second code value for a second color at the location in the color image with an estimate for the second code value at the location obtained from one or more surrounding locations, in order to verify that the location contains a microdot;
    (d) comparing a third code value for a third color at the location in the color image with an estimate of the third code value for the location obtained from one or more surrounding locations, in order to verify that the location contains a microdot; and
    (e) replacing the blue, second, and third code values at the location with the estimated code values only if the results of steps (b), (c) and (d) meet predetermined criteria, thereby removing the effect of a microdot at the location.

2. The method in claim 1, wherein step (c) includes providing a red code value as the second code value.

3. The method in claim 1, wherein step (d) includes providing a green code value as the third code value.

4. A method for removing microdots from a color image, the method comprising the steps of:
    (a) providing a color image having a plurality of microdots arranged in a predetermined array within image data;
    (b) calculating a difference between a blue code value at a location in the color image with an estimate of the blue code value for the location obtained from one or more surrounding locations;
    (c) comparing the difference calculated in step (b) to one or more thresholds in order to determine whether the location may contain a microdot that requires correction;
    (d) calculating a difference between a second code value for a second color at the location in the color image with an estimate of the second code value for the location obtained from one or more surrounding locations;
    (e) comparing the difference calculated in step (d) to one or more thresholds in order to verify that the location contains a microdot;
    (f) calculating a difference between a third code value for a third color at the location in the color image with an estimate of the third code value for the location obtained from one or more surrounding locations;
    (g) comparing the difference calculated in step (f) to one or more thresholds in order to verify that the location contains a microdot;
    (h) replacing the blue, second, and third code values at the location with estimated code values only if the results of steps (c), (e) and (g) satisfy the thresholds, thereby removing the effect of a microdot at the location.

5. A computer program product for removing yellow microdots from a color image, comprising a computer readable storage medium having a computer program stored thereon for performing the steps of:
    (a) processing a color image having a plurality of microdots arranged in a predetermined array within image data;
    (b) comparing a blue code value at a location in the color image with an estimate of the blue code value for the location obtained from one or more surrounding locations, in order to determine whether the location may contain a microdot that requires correction;
    (c) comparing a second code value for a second color at the location in the color image with an estimate for the second code value at the location obtained from one or more surrounding locations, in order to verify that the location contains a microdot;
    (d) comparing a third code value for a third color at the location in the color image with an estimate of the third code value for the location obtained from one or more surrounding locations, in order to verify that the location contains a microdot; and
    (e) replacing the blue, second, and third code values at the location with the estimated code values only if based on the results of steps (b), (c) and (d) meet predetermined criteria, thereby removing the effect of a microdot at the location.

6. The computer program product in claim 5, wherein step (c) includes providing a red code value as the second code value.

7. The computer program product in claim 5, wherein step (d) includes providing a green code value as the third code value.

8. A computer program product for removing microdots from a color image, comprising a computer readable storage medium having a computer program stored thereon for performing the steps of:
    (a) processing a color image having a plurality of microdots arranged in a predetermined array within image data;
    (b) calculating a difference between a blue code value at a location in the color image with an estimate of the blue code value for the location obtained from one or more surrounding locations;
    (c) comparing the difference calculated in step (b) to one or more thresholds in order to determine whether the location may contain a microdot that requires correction;
    (d) calculating a difference between a second code value for a second color at the location in the color image with an estimate of the second code value for the location obtained from one or more surrounding locations;
    (e) comparing the difference calculated in step (d) to one or more thresholds in order to verify that the location contains a microdot;
    (f) calculating a difference between a third code value for a third color at the location in the color image with an estimate of the third code value for the location obtained from one or more surrounding locations;
    (g) comparing the difference calculated in step (f) to one or more thresholds in order to verify that the location contains a microdot;
    (h) replacing the blue, second, and third code values at the location with estimated code values only if the results of steps (c), (e) and (g) satisfy the thresholds, thereby removing the effect of a microdot at the location.

* * * * *

UNITED STATES PATENT AND TRADEMARK OFFICE
CERTIFICATE OF CORRECTION

PATENT NO. : 6,167,152
DATED : December 26, 2000
INVENTOR(S) : Jay S. Schildkraut It is certified that error appears in the above-identified patent and that said Letters Patent is hereby corrected as shown below:

Equation 4,
Column 4, the equation should broken up on three separate lines as shown below:

$$-- V'_r(p, l) = V_r(p, l) + C_r$$

$$V'_g(p, l) = V_g(p, l) + C_g \qquad \text{Eqs. 4}$$

$$V'_b(p, l) = V_b(p, l) + C_b \quad --$$

Column 5,
Line 26, -- (c) should be (e) --

Signed and Sealed this

Fourth Day of December, 2001

*Attest:*

NICHOLAS P. GODICI
*Attesting Officer*     Acting Director of the United States Patent and Trademark Office